Dec. 19, 1967   J. KASTNER ET AL   3,359,419
RADIOGRAPHIC NONDESTRUCTIVE TESTING METHOD
Filed Oct. 6, 1965
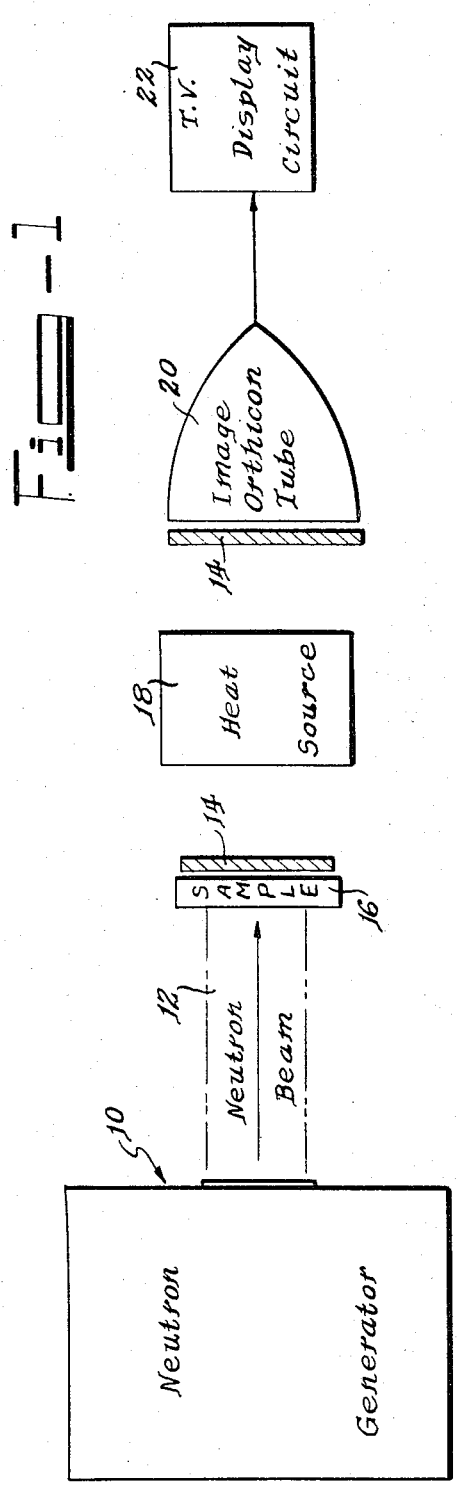
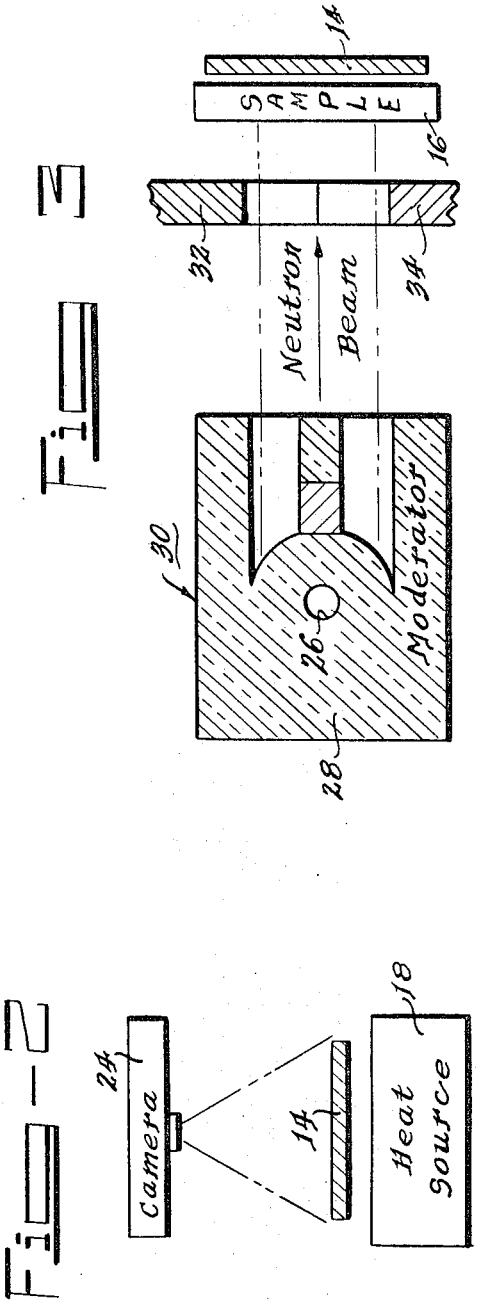
Inventors
Jacob Kastner
Harold Berger
By: *[signature]*
Attorney

United States Patent Office 3,359,419
Patented Dec. 19, 1967

3,359,419
RADIOGRAPHIC NONDESTRUCTIVE TESTING METHOD
Jacob Kastner, Park Forest, and Harold Berger, Naperville, Ill., assignors to the United States of America as represented by the United States Atomic Energy Commission
Filed Oct. 6, 1965, Ser. No. 493,598
8 Claims. (Cl. 250—83.1)

This invention relates to nondestructive testing methods and more particularly to radiographic nondestructive testing methods. The invention described herein was made in the course of, or under, a contract with the U.S. Atomic Energy Commission.

Radiographic methods are commonly used in industry for the nondestructive testing of materials. One such method is neutron radiography. Present-day neutron radiographic techniques utilize two basic methods of operation. The first comprises exposing the test object to a neutron beam with a converter screen and film to record the test object image. The second comprises exposing a test object to a neutron beam with a potentially radioactive material to record the image of the test object, an autoradiograph of the radio-active material later providing a film image. Both of these techniques involve instantaneous reactions with the neutron beam, thereby requiring a high-intensity neutron beam. Further, since such a high-intensity beam is required, the technique does not readily lend itself to portability. Where the film is used with a converter screen, gamma fogging of the film will occur for extended exposure therewith. Accordingly, it becomes readily apparent that neither of the above two methods is capable of integrating neutron image information in the presence of interfering gamma radiation for long periods of time.

It is an object of the present invention to provide a radiographic method for obtaining an image of a test sample over a long period of time.

It is another object of the present invention to provide an improved neutron radiographic method for obtaining the image of a test sample.

It is another object of the present invention to provide a neutron radiographic method for obtaining an image of a test sample over a long period of time.

It is another object of the present invention to provide a portable neutron radiographic method for obtaining an image of a test sample.

It is yet another object of the present invention to provide a neutron radiographic method for obtaining an image of a test sample by integrating image information thereon in the presence of gamma radiation.

Other objects of the present invention will become more apparent as the detailed description proceeds.

In general, the present invention comprises generating a radiation beam, mounting a test sample adjacent an ionizing-radiation-sensitive water-white thermoluminescent material and exposing said water-white thermoluminescent material to said radiation beam via said sample for a predetermined length of time. The thermoluminescent material is then excited and the light emitted therefrom recorded to present a radiographic image of the sample.

Further understanding of the present invention may best be obtained from consideration of the accompanying drawings wherein:

FIG. 1 is a block diagram of an apparatus for the practice of the present invention.

FIG. 2 is a block diagram of an alternate apparatus for radiographic readout with the apparatus of FIG. 1.

FIG. 3 is a block diagram of a portable apparatus for the practice of the present invention.

Turning now to FIG. 1, a general apparatus for the practice of the present invention with a neutron beam is illustrated. A neutron generator 10, such as the CP-5 reactor located at Argonne National Laboratory, Argonne, Ill., is used to generate a neutron beam 12. A neutron-sensitive water-white thermoluminescent compound formed into a detector 14 is mounted adjacent a test sample 16, preferably in contact therewith. The thermoluminescent compound 14 is then exposed to the neutron beam 12 via the sample 16 for a predetermined length of time. After exposure, the thermoluminescent compound 14 is then heated by a heat source 18, whereby the image of the test sample 16 stored therein is released in the form of light. This light is then detected by light-detecting means, such as an image orthicon tube 20, which is coupled to a TV display circuit 22. Thus, using neutron-sensitive water-white thermoluminescent compounds together with a neutron beam, one may obtain a radiographic image of a test sample.

It is to be noted that the action of the neutron-sensitive water-white thermoluminescent detector is an integrating reaction whereby the sample may be exposed in a neutron beam together with the detector 14 for a long period of time (months) without saturation of the detector 14. Consequently the thermoluminescent detector 14 may be used with low-intensity neutron sources (lower than $10^4$ neutrons/cm.$^2$/sec.). Further, after the thermoluminescent detector 14 has been exposed to the neutron beam, it may be stored for long periods of time at the temperature (or lower temperatures) at which the exposure was made before readout is effected.

With the apparatus of FIG. 1 the thickness of the thermoluminescent detector 14 is dependent upon the material under test and the resolution of the image desired. For most practical purposes, it has been found that 1 mm. in thickness is satisfactory with a detecting surface area slightly larger than the cross sectional area of the neutron beam. The time of exposure of the thermoluminescent material is dependent upon the intensity of the neutron beam used. For example, using a neutron beam intensity of $3 \times 10^7$ neutrons/cm.$^2$/sec. on a cadmium sample ½ inch by 1½ inches by 100 mils thick, the thermoluminescent detector exposure period was approximately 3 hours therefor. With lower beam intensities, the exposure period will obviously be longer.

As stated, neutron-sensitive water-white thermoluminescent compounds are used for the present invention. All such compounds will work as the detector 14 hereinbefore described. However, if lithium fluoride or lithium aluminate having the natural abundance composite of lithium therein is used as the thermoluminescent compound for the detector 14 in FIG. 1, it is preferred that they be enriched with $Li^6$ to increase the neutron sensitivity thereof. Natural lithium fluoride or lithium aluminate will work but, by enriching the lithium so that it is 95.6% by weight $Li^6$ and 4.4% by weight lithium, improved resolution will be effected thereby. It is to be further noted that, though one may use a multicrystalline layer for the detector 14, an improved performance may be obtained by using single-crystal material.

Though the apparatus of FIG. 1 shows an image orthicon tube light-sensing apparatus, the method of the present invention is not to be limited thereto. It is to be understood that other light-recording means may be utilized for the practice of the present invention. For example, in FIG. 2 is shown an alternate method for detecting the image on film. The thermoluminescent detector 14 is placed in a dark room above a heat source 18 and a camera 24 is mounted thereabove. With the shutter of the camera 24 open, the thermoluminescent detector 14 is heated to a particular temperature (210° C. for lithium oride) and the light resultant therefrom detected by camera 24.

Turning now to FIG. 3, an apparatus is shown wherethe practice of the present invention may be accomplished in a portable manner. As previously explained, the thermoluminescent detector 14 has an integrating reaction with the neutron beam whereby low-intensity neutron beams may be used. Thus, the present invention may be readily used in a portable manner. A neutron source 26, such as plutonium-beryllium, is mounted in a paraffin moderator 28 to form a howitzer-type source 30, as described by G. A. Fink, Phys. Rec. 50, 738 (1936) and K. J. McCallum, Nucleonics 5, 11 (July 1949). The neutron flux radiating from the source is formed into a beam using boral sheets 32 and 34. The water-white thermoluminescent compound detector 14 is exposed to the neutron beam by the test sample 16 as hereinbefore described for the apparatus of FIG. 1. The following size relationships are satisfactory with the apparatus of FIG. 3. With a paraffin moderator approximately one foot square spaced approximately one foot from the boral sheets 32 and 34 and having a beam intensity of 10 to 100 neutrons/cm.$^2$/sec., the test object would be approximately ½ inch from the boral sheets 32 and 34 and the thermoluminescent detector 14 in contact with the test sample 16 if possible.

As for the apparatus of FIG. 1, the time of exposure of the thermoluminescent material depends upon the intensity of the neutron beam and may extend for hours, days or months. Further, the construction and material enrichment of the detector 14 are as set forth for the apparatus of FIG. 1.

It is to be understood that, though the foregoing description has been directed to the use of neutron radiographic methods, the present invention is not to be limited thereto. The present invention is also applicable to X-ray imaging. Instead of a neutron source, a low-intensity radioisotopic X-ray source such as thulium, ytterbium or gadolinium may be used. With such sources an X-ray-sensitive water-white thermoluminescent compound is used in the manner hereinbefore described with the neutron radiographic method. All such compounds will work with the method of the present invention. It is to be noted, however, that if lithium fluoride or lithium aluminate is used in the X-ray radiographic method, then enrichment of the lithium is not necessary.

Persons skilled in the art will, of course, readily adapt the general teachings of the invention to embodiments different than the embodiments illustrated. Accordingly, the scope of the protection afforded the invention should not be limited to the particular embodiment illustrated in the drawings and described above, but should be determined only in accordance with the appended claims.

The embodiments of the invention in which an exclusive property or privilege is claimed are defined as follows:

1. A method for obtaining a radiographic image of a sample, comprising generating a radiation beam, mounting an ionizing-radiation-sensitive water-white thermoluminescent material adjacent said sample, exposing said thermoluminescent material to said radiation beam via said sample, exciting said thermoluminescent material to cause luminescence thereof, recording light released by said thermoluminescent material during the luminescence thereof wherefrom a radiographic image of said sample is obtained.

2. A method for obtaining a radiographic image of a sample, comprising generating a neutron beam, mounting a neutron-sensitive water-white thermoluminescent material adjacent said sample, exposing said thermoluminescent material to said neutron beam via said sample, exciting said thermoluminescent material to cause luminescence thereof, recording light released by said thermoluminescent material during the luminescence thereof wherefrom a radiographic image of said sample is obtained.

3. A method for obtaining a radiographic image of a sample, comprising generating a neutron beam, mounting a lithium fluoride or lithium aluminate thermoluminescent material adjacent said sample, exposing said thermoluminescent material to said neutron beam via said sample, exciting said thermoluminescent material to cause luminescence thereof, recording light released by said thermoluminescent material during the luminescence thereof wherefrom a radiographic image of said sample is obtained.

4. A method for obtaining a radiographic image of a sample, comprising generating a neutron beam, mounting adjacent said sample a lithium fluoride or lithium aluminate material wherein the lithium is 95.6% by weight $Li^6$ and 4.4% by weight lithium, exposing said thermoluminescent material to said neutron beam via said sample, exciting said thermoluminescent material to cause luminescence thereof, recording light released by said thermoluminescent material during the luminescence thereof wherefrom a radiographic image of said sample is obtained.

5. A method for obtaining a neutron radiographic image of a sample, comprising generating a neutron beam, mounting a lithium fluoride thermoluminescent material approximately 1 mm. in thickness adjacent said sample, exposing said thermoluminescent material to said neutron beam via said sample, heating said thermoluminescent material to a temperature of approximately 210° centigrade, recording light released by said thermoluminescent material during the heating thereof wherefrom a neutron radiographic image of said sample is obtained.

6. The method according to claim 5 wherein said neutron beam has an intensity of approximately $3 \times 10^7$ neutrons/cm.$^2$/sec. and said thermoluminescent material is exposed thereto via said sample for a period of approximately 3 hours.

7. A method for obtaining a radiographic image of a sample, comprising generating an X-ray beam, mounting an X-ray-sensitive water-white thermoluminescent material adjacent said sample, exposing said thermoluminescent material to said X-ray beam via said sample, exciting said thermoluminescent material to cause luminescence thereof, recording light released by said thermoluminescent material during the luminescence thereof wherefrom a radiographic image of said sample is obtained.

8. A method for obtaining a radiographic image of a sample, comprising generating a low-intensity X-ray beam, mounting a lithium fluoride or lithium aluminate thermoluminescent material adjacent said sample, exposing said thermoluminescent material to said low-intensity X-ray beam via said sample, exciting said thermoluminescent material to cause thermoluminescence thereof, recording light released by said thermoluminescent material during the luminescence thereof wherefrom a radiographic image of said sample is obtained.

No references cited.

ARCHIE R. BORCHELT, *Primary Examiner.*